Sept. 5, 1961  F. M. POTTER ET AL  2,998,937
WINDING APPARATUS FOR DYNAMO ELECTRIC MACHINES
Filed Oct. 15, 1957  4 Sheets-Sheet 1
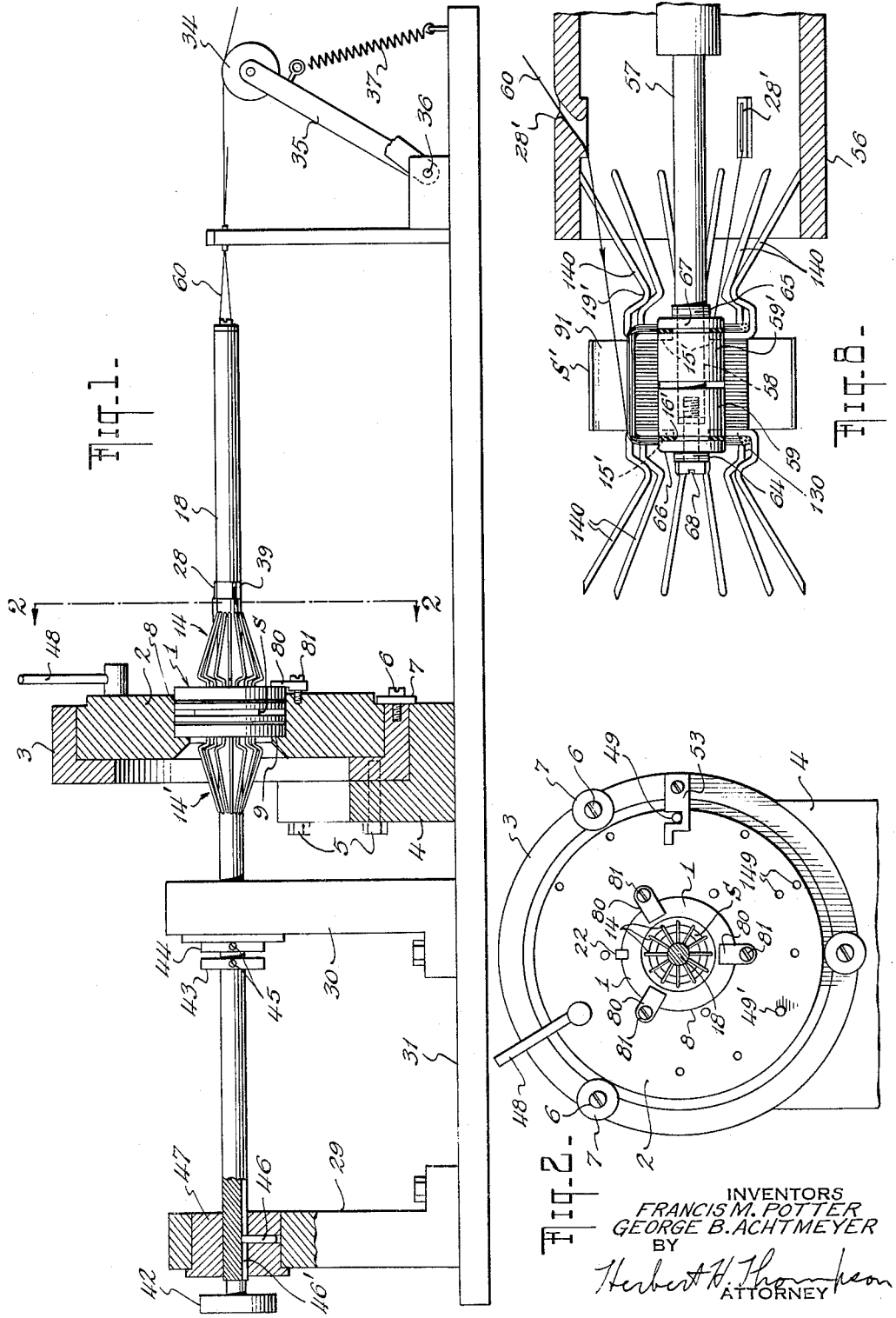
INVENTORS
FRANCIS M. POTTER
GEORGE B. ACHTMEYER
BY
Herbert H. Thompson
ATTORNEY

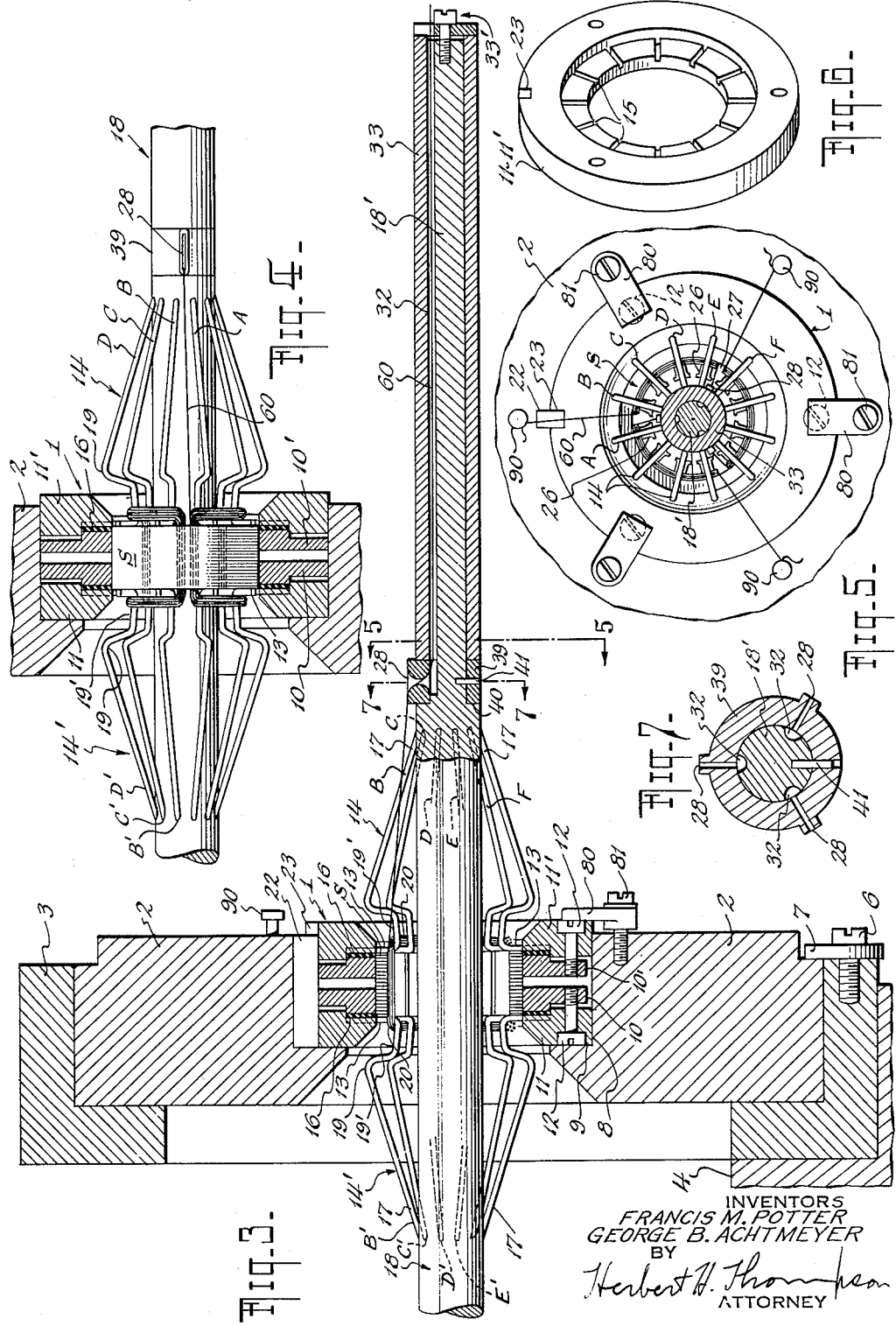

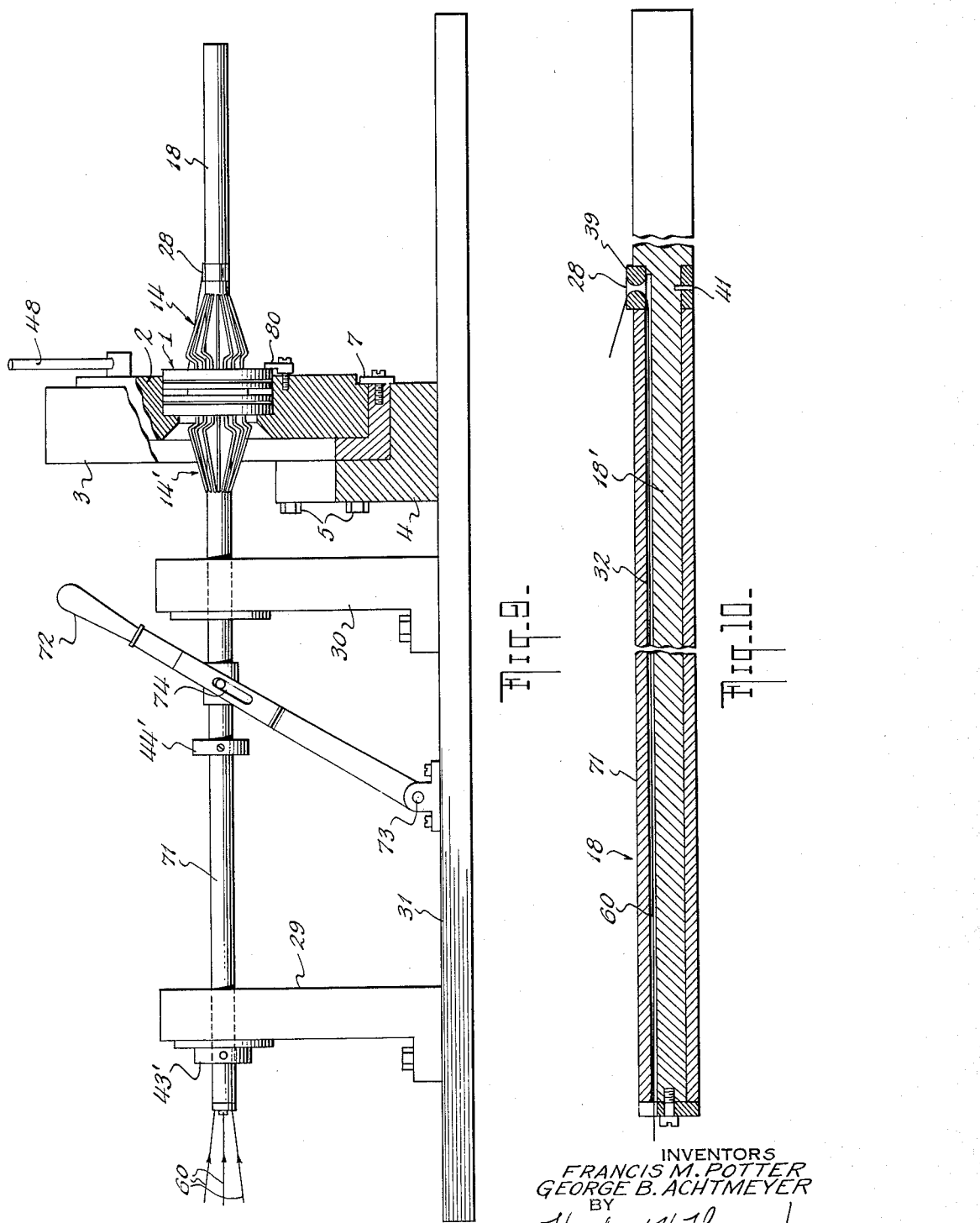

Sept. 5, 1961 F. M. POTTER ET AL 2,998,937
WINDING APPARATUS FOR DYNAMO ELECTRIC MACHINES
Filed Oct. 15, 1957 4 Sheets-Sheet 4
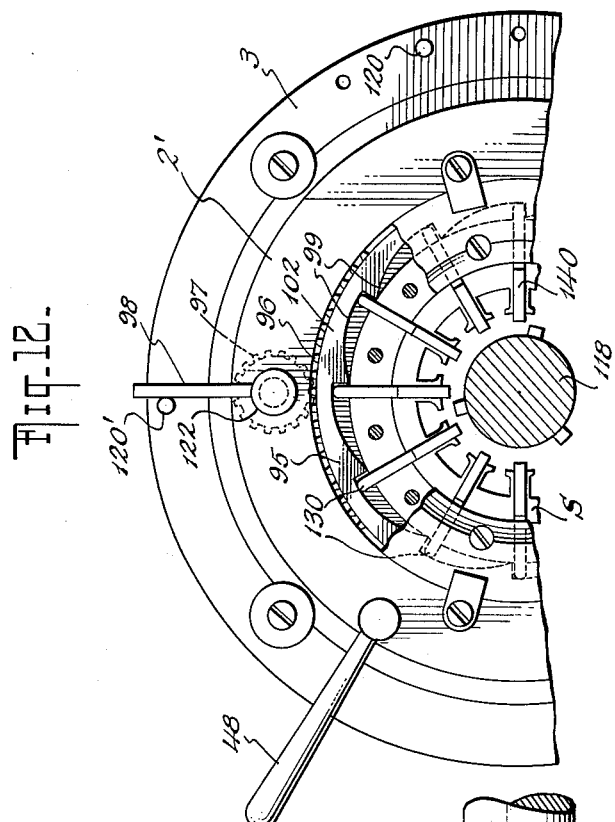
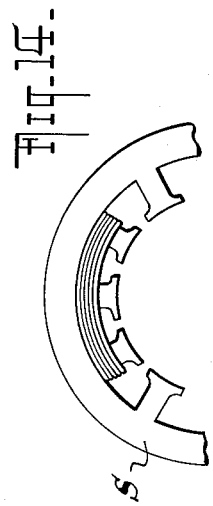
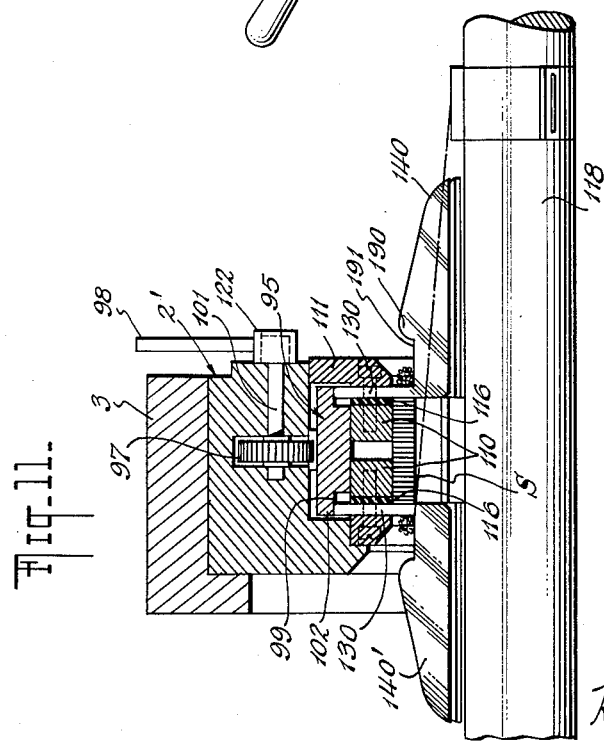
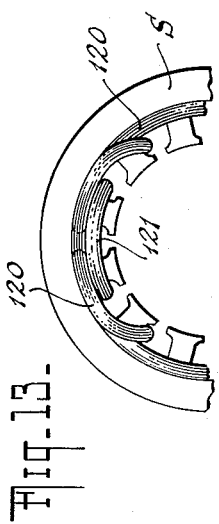
INVENTORS
FRANCIS M. POTTER
GEORGE B. ACHTMEYER
BY
Herbert H. Thompson
ATTORNEY

United States Patent Office

2,998,937
Patented Sept. 5, 1961

2,998,937
WINDING APPARATUS FOR DYNAMO ELECTRIC MACHINES
Francis M. Potter, Garden City, and George B. Achtmeyer, East Norwich, N.Y., assignors to Sperry Rand Corporation, Great Neck, N.Y., a corporation of Delaware
Filed Oct. 15, 1957, Ser. No. 690,352
6 Claims. (Cl. 242—1.1)

This invention relates to the winding of armatures or stators of dynamo electric machines, and more especially, to the winding of the hollow stators of such machines in which the slots for the windings are formed in the inner cylindrical surface of a hollow cylindrical core. By our improved method and machine, the windings are wound directly in these slots, whereas the present practice usually comprises forming the windings on a separate mandril and inserting them by hand after being so formed in the slots of the stators. This process is slow, tedious and difficult, especially for the stators of miniaturized motors and generators which are now being used in quantity in the electrical industry. With our machine for winding the coils directly in the slots much time is saved and more perfectly formed stators are secured. While our invention is especially adapted for the winding of hollow stators as stated, it may also be used for winding armatures with external slots, as is the case with most armatures.

While we are aware that automatic machines have been proposed for winding the slotted cores of dynamo electric machines, none have met with material success because of the complexity created by trying to design a machine for moving wire engaging fingers in the same manner that a skilled winder would move his fingers during the winding process. In our invention, on the other hand, fixed guides are employed for the wire, and only two motions imparted to the machine, i.e., alternate reciprocation and simple oscillation through the angle subtended between the slots being wound. Hence, although we have shown a hand-operated winding machine, full automatic operation of the same becomes simple and obvious.

Also, according to our invention, several coils may be wound simultaneously in a plurality of pairs of slots for one setting of the machine, thereby effecting a great time saving in the winding of stators having a plurality of field coils.

Referring to the drawings in which several forms of the invention are shown,

FIG. 1 is a front elevation, partly in section, of an elementary form of our stator winding machine, that is, a machine arranged for hand operation;

FIG. 2 is a vertical transverse section of the same taken on line 2—2 of FIG. 1;

FIG. 3 is a vertical longitudinal section of the main portion of the machine on a larger scale showing the core holder and feed rod;

FIG. 4 is a horizontal section of the same;

FIG. 5 is a vertical section taken on line 5—5 of FIG. 3;

FIG. 6 is a perspective view of the finger retaining ring portion of the holder;

FIG. 7 is a section also taken on line 7—7 of FIG. 3, but showing on a larger scale only the feed shaft and the eye through which the wire emerges;

FIG. 8 (Sheet 1) is a section of a modified form of the invention adapted for the winding of external slots in armatures;

FIG. 9 is a front elevation, partly in section, of a modification which facilitates reloading the machine after one winding operation has been completed;

FIG. 10 is a longitudinal section on a larger scale of the feed rod shown in FIG. 9;

FIG. 11 is a sectional detail similar to FIG. 3 but of a modified form of the invention;

FIG. 12 is a sectional detail similar to FIG. 5 but of the modified form shown in FIG. 11;

FIG. 13 is a detail of a portion of a partially wound stator showing the improved position of the end windings secured by this modification; and FIG. 14 is a similar detail showing another method of winding possible in this modified form of the invention.

Referring to FIGS. 1–6, a multi-part holder 1 for the stator core S to be wound is detachably clamped within a hollow round chuck 2 which in turn is rotatably mounted within an open sided guide or channel ring 3 secured in the main bracket 4 by screws 5. Detachable set screws 6 having collars 7 are shown spaced around the outer periphery of ring 3 to hold chuck 2 in place, but permit rotation thereof in ring 3. The chuck 2 is provided with a recessed aperture 8 extending therethrough but having an internal shoulder 9 against which the holder 1 is detachably clamped by fingers 80 and set screws 81.

Holder 1 is a composite demountable structure preferably comprising a pair of inner rings 10 and 10' which surround the core S to be wound and are individually and detachably clamped to a second pair of rings 11 and 11' by means of a plurality of spaced set screws 12, threaded into rings 10 and 10'. The upturned inner ends 13 of two sets of oppositely extending fingers or guides 14, 14' are inserted before core S is fitted within the holder during the assembly of the holder structure and fitted into radial open channels 15 around the inner faces of the rings 11 and 11'. Fibre washers 16 are placed between rings 10 and 11 and between rings 10' and 11' so that when the set screws 12 are tightened the ends 13 of the fingers 14 are firmly held in place and clamped against the core, with the fingers radially positioned as shown in the drawings so that the outer end 17 of each finger will rest against or close to the feed rod 18 in the assembled position. Each guide has a knee portion 19 rising above the rod and beyond the core, and a U-shaped or channel portion 19' adjacent the inner end of each finger extending radially inwardly and then axially to form a rest for the inner turns of the coil 20 being wound.

The holder or ring structure may be completely asembled with the fingers attached thereto and with the core therein before being placed within aperture 8 in chuck 2 or the ring structure 10 and 11 with its fingers 14 may first be inserted within the aperture 8 of chuck 2 to bring it against shoulder 9 followed by core S and rings 10' and 11' and its fingers 14'. The whole is then inserted in ring 3 with key way 23 engaging key 22 in the ring 3 to prevent relative rotation. This assembly is then clamped in place in chuck 2 by the set screws 81 and fingers 80 as shown in FIG. 3 with the ends of the guide fingers 14, 14' resting against the feed rod 18 so that the stator is clamped between the upturned ends 13 of the two groups of fingers 14 and 14'. During assembly, the fingers 14, 14' should be symmetrically positioned with respect to the poles 26 and slots 27 in the stator S with the eye or nozzle 28 of the feed rod 18 between adjacent poles 26 and fingers 14 so that the wire 60 is drawn into the two slots between adjacent pairs of poles as the rod 18 is reciprocated.

Feed rod 18 may extend through and well beyond sides of the chuck 2 and the outer ends of the guide fingers, as shown in FIG. 1, and is slidably mounted in spaced brackets 29, 30 fixed to the base 31. At least one end of the rod is provided with one or more channels 32 for the wire or wires 60 to be wound on the stator. Preferably, the channeled end 18' of the rod is reduced in diameter and the channels 32 formed in the outer surface thereof as grooves (FIG. 5). An outer sleeve 33 held in place by cap and screw 33' is shown as enclosing the reduced end 18' of rod 18. The wire 60 comes from a spool (not shown) and passes over tension wheel 34 rotatably mounted in bracket 35 which is pivoted at 36 to the base 31 and placed under spring tension by spring 37 so as to keep the wire taut as it is being fed through the channel.

As many channels 32 for the wires are provided in the rod 18 as the number of coils to be wound simultaneously. For example, three such channels are shown in the drawings placed 120° apart and accordingly if three coils are to be wound at once a tension device and spool is provided for each wire although only one of such is shown in FIG. 1 for simplicity. Each wire is threaded through a channel and emerges through the radial chamfered eye or hole 28 in a small ring or eyelet 39. Said ring is shown as clamped between the shoulder 40 in rod 18 formed by the reduced end 18' of the same and said sleeve 33 and is keyed against rotation as by key 41. After being threaded through each hole, the free end of each wire is fastened to a post 90 on chuck 2. Each eye is located in radial alignment with a slot and between a pair of fingers.

The rod 18 is shown as given a reciprocating intermittent motion as by means of a knob 42 on one end of the same, the limits of the reciprocating motion being fixed by stops 43, 44 adjustably mounted on rod 18 as by means of set screws 45. The stops are adjusted for the thickness of cores being wound. Rotation of rod 18 may be prevented by key 46 and key way 46' between the rod and bushing 47 secured in bracket 29.

At or near the end of each stroke of the feed rod in each direction a relative intermittent rotation or oscillation first in one direction and then the other is imparted to the core and fingers through an angle equal to the angle between the pair of slots in the core which are being wound. Thus, if a three phase stator is being wound, three pairs of slots may be wound simultaneously with the coils 120° apart so that the head is given a rotation of about 120° first in one direction and then the other at the end of each stroke in each direction. Such motion may be readily accomplished by moving a handle 48 secured to the chuck 2 to turn the chuck until one of stop pins 49 and 49' engage the fixed stop bracket 53. Said pins are shown as placed 120° apart and the bracket is arranged so as to permit a full 120° movement of the head by having the pins placed on different radii in the chuck and the bottoms of the stop which strikes the pins offset in the direction of movement of the pin. Additional mounting holes 149 for pins 49, 49' are provided in chuck 2 to accommodate different types and a different number of windings.

Operation of the first stroke of the feed rod carries the wire from the position shown in FIGS. 1 and 3 between two fingers A and B, through the stator and beyond the ends of the group of fingers 14' on the opposite side of the chuck. Then the chuck is rotated through the set angle so that when the feed rod is moved back toward its original position the wire is carried up over the intermediate fingers B', C', D' and E' which are four in number in the setup described. As the feed rod continues to move to the right, the loop thus formed is drawn over these intermediate fingers and is pulled down into the U-shaped notch 19' beyond the humps or knees 19 so that it is then drawn across one end of the face of the stator but is bowed outwardly or radially so as not to extend below the inner surface of the poles where it would interfere with the armature when inserted in place and so that no wire is drawn across the intermediate slots, leaving the slots clear for the next winding. This configuration also allows space for the succeeding groups of coils. The wire is then drawn through the stator back between fingers E and F of group 14 and beyond the ends of the fingers when the chuck 2 is rotated back to its original position so that the wire is drawn across intermediate fingers B, C, D and E as at the other end of the stroke. This process is continued until one coil is wound, or if a plurality of coils are being wound simultaneously until the group of coils is wound. The core is shown as having 12 slots so that it is necessary to effect four separate winding operations to wind the four groups of coils, three coils being wound in each operation, but of course with a lesser or greater number of coils, a lesser or greater number of operations will be required.

From the foregoing, it will be seen that each wire is generally wound in a closed four-sided path which has two sides substantially in radial alignment with the two spaced slots being wound and the two ends of said path bowed radially outwardly by the intermediate fingers to give room for the other crossed windings at the ends of the core and for the armature or shaft. To accomplish this, the wire is passed around the outside of each of the pair of pins (B and E and B' and E') adjacent the pair of slots being wound, as shown in FIG. 5, so that at each end the wire passes over these two fingers and the intermediate fingers (if any) C and D and C' and D'.

While in the embodiment shown the feed rod is reciprocated and the chuck 2 rotated, it is obvious that these relative motions may be also secured by rotating the rod and reciprocating the holder or by performing both motions on either the holder or the feed rod, since all that is necessary is that the two relative motions of the feed rod and core (reciprocation and oscillation) be staggered. It is also obvious that if the slots in the core are skewed, relative rotation should also be given the rod and the chuck during the feeding strokes of the rod to guide the wire into the skewed slots in the stator.

To make a further winding, the position of the stop pins 49 and 49' is changed and the next winding operation is performed. After the winding is finally completed, the assembly of wound stator and holder including clamp rings 10, 11 and 10', 11' and fingers 14 are removed from chuck 2 and rod 18. The chuck 2 is then disassembled and fingers 14, 14' removed so that the stator is ready to use as soon as the ends of the coils are properly connected and preferably also the end turns formed or compressed to make the stator compact with a minimum over-all length.

Our invention is also adapted for winding armatures with external slots as well as hollow stators. Such a modification is shown in FIG. 8 which embodies a similar technique in which the wire 60 is fed through holes or eyes 28' in an external reciprocated sleeve 56 which constitutes the feed member and the fingers 140 are preferably flared outwardly instead of inwardly to engage the inner surface of said sleeve 56. Either the sleeve 56 or rod 57 on which the armature S' is fastened may be reciprocated and/or oscillated as before. In this case the winding action is similar since the wire will now be placed within the external slots 91 by being guided over the underside of the intermediate fingers instead of the outside of the fingers as in FIG. 3, so as to pass around the knees 19' and be drawn into the bottom of the slots.

The holding mechanism for the armature in this modification is shown as comprising a shaft 57 with a reduced end 58 having collars or spools 59, 59' loosely mounted thereon. Each collar has radial channels 15' as before to receive the ends 130 of the fingers 140 and each collar has a threaded extension 64 and 65. Clamping nuts 66, 67 on said threads clamp the fibre washers 16' against the finger ends, thereby holding the armature S' in place. A locking screw 68 is also provided which is threaded in the reduced end 58 of shaft 57 for locking the assembly together during the winding operation. The armature shaft may be inserted after the armature is wound and removed from the winding machine, or it is possible to wind an armature after the shaft has been secured therein by our method.

A slight modification of our stator winding machine is shown in FIGS. 9 and 10 which permits a wound stator and its holder to be removed from the machine without having to cut the wires leading into the feed rod 18. According to this modification, instead of channeling the free end of the feed tube, as in FIGS. 1 and 3, the journalled end 71 of the feed tube is channeled, as shown in FIG. 9, and the wires are lead therethrough. Therefore, the stator S to be wound and its chuck 2 may be inserted in the machine from the right after the feed tube is threaded with its wire or wires and again removed therefrom without cutting the wires leading to the wire holding spools. In this modification, the feed rod is shown as reciprocated by handle 72 pivoted at 73 on the base 31 by having a slot connection 74 with said rod. Adjustable limit stops in this figure are shown at 43' and 44'.

Our winding machine has many advantages over prior winding methods besides greatly reducing the time consumed and operations necessary in effecting a complete winding operation. Thus, if each pair of coils is wound separately, as is necessary by hand winding or in prior winding machines, it is necessary to make a connection between the two sets of windings in each slot after the winding operation is otherwise completed and the coils inserted in the slots. With our machine, on the other hand, the two coils in each slot are made from one unsevered wire during the winding operation since the chuck is merely rotated through the required angle after one coil is wound without severing the wire. Thus, when the whole number of coils is wound and the stator otherwise ready for operation the only electrical connections that need be made are the usual Y connections to the three sets of three phase windings if a three phase winding is being applied.

While we have described our invention in its preferred embodiments, it is to be understood that the words which we have used are words of description rather than of limitation and that changes within the purview of the appended claims may be made without departing from the true scope and spirit of our invention in its broader aspects.

Thus, of course, the guiding fingers need not be made of wire or rods as shown in FIGS. 1 and 3 but may be made in the form of cam or L-shaped plates 140, 140' as shown in FIGS. 11 and 12. These plates like the wire guides each have a knee-shaped portion 190 and channel portion 191 to form a guide and base for the turns of the coil being wound. Each guide also has an up-standing or L portion 130 which is clamped as before in slots in each ring 111 by each inner ring 110 and washer 116 as shown. Neither the bottoms of the plates 140 nor the ends of fingers 14 need actually touch the feed rod 118 as long as the outer ends of the same are below the wire being wound at that point.

FIGURES 11 and 12 also illustrate a further modification by which the radial distance of the guides 140 from the axis of the core S may be varied during or between winding operations to secure more compact windings, especially at the ends of the stator. According to this modification, a camming ring 95 is rotatably mounted around rings 110 and between rings 111 and provided with gear teeth 96 by which it may be rotated through a limited angle by a pinion 97 turned from handle 98 journaled in the ring 2' on common shaft 101. The outer under surfaces 102 of said cam ring 95 is provided with cam surfaces 99 which engage the outer ends of the upright portions 130 of the guides 140, 140'. By rotating the handle 98 counterclockwise in FIG. 12, the camming surfaces will be moved clockwise so as to force the guides inwardly to reduce the diameter of the circular layer of wire being wound. One method of using this modification is to wind the longer layers of coils 120 in FIG. 13 first and then to wind the shorter layers 121 after the guides have been moved from the outer position shown in FIG. 12 to an intermediate position. This has the advantage of winding more tightly the coils in the slots and of placing the second or shorter coils as they pass around the ends of the stator within instead of on top of the longer coils as shown in FIG. 13, thus reducing the over-all length of the wound core and rendering it more compact.

Another possible use of this modified form of the invention is to wind heavy wire with each successive winding on top of the preceding one instead of first side-by-side in the bottom of the slot. This may be done by turning the handle 98 through a small angle sufficient to move the guides inwardly the diameter of each wire at the end of each complete reciprocation of the carriage to produce a coil as diagrammatically shown in FIG. 14. Such step-by-step advance may be readily secured by inserting a pin 120 in the proper hole 121 in the periphery of stationary ring 3 in the path of the handle 98 as the ring 2' is given an oscillatory motion. Therefore, when the handle 98 strikes pin 120, it is given a predetermined angular movement to rotate the cam 95 clockwise through a predetermined angle and move the guides inwardly. On the return stroke, handle 98 will strike a second pin 120' in holder 3 which will rotate the handle back to its original position, but means are provided so that this reverse rotation will not rotate the pinion 27 in the reverse direction. Such action may readily be provided by incorporating a one-way clutch or ratchet (of any known construction) between the hub 122 of said handle and shaft 101 which allows the hub to slip around the shaft in one direction but grips the shaft in the other direction. Therefore, the guides are only advanced through one step for each complete reciprocation of the handle 98.

What is claimed is:

1. Apparatus for laying a winding in a pair of slots in the slotted core of a dynamo electric machine, comprising a temporary holder for said core, said temporary holder securing said core at the opposite ends thereof, a feed member of substantially circular cross section extending in coaxial relationship with the core mounted in said holder, said feed member having an eye intermediate its ends for the passage of wire from an external supply through said eye, two pairs of wire guide fingers detachably secured to each end of said holder remote from said core, one finger adjacent each end of each of said slots, each of said guide fingers having a U-shaped portion adjacent said holder for supporting the end turn portions of the winding, said fingers further extending axially beyond the ends of said holder and terminating at spaced points substantially at the surface of said feed member, said points being spaced along a curve transverse to the axis of said feed member by amounts sufficient to permit the entry of said wire therebetween; means for imparting relative rectilinear reciprocation to said holder and feed member solely along the axis of said core to cause the eye to pass from one end to the other of said holder and core to one side of a finger of each pair, and means for relatively rotating said holder and feed member about the axis of said core through at least the angle between said slots just prior to each return stroke whereby the eye on the return strokes of reciprocation passes to the remote side of the other fingers of each pair.

2. The invention set forth in claim 1, wherein said feed member is a rod provided with a wire channel leading from one of its ends to said eye.

3. The invention set forth in claim 2, wherein said wire channel is a longitudinal groove in said rod, and a tubular sleeve enclosing said rod substantially throughout the length of said groove.

4. The invention set forth in claim 3, wherein said rod is supported solely by means disposed beyond one end of said core holder, and said wire channel is in the portion of said rod engaged by said supporting means.

5. The invention set forth in claim 1, further including means for moving the U-shaped portions of said guide fingers radially with respect to said axis of said core.

6. The invention set forth in claim 1 wherein the feed member is a sleeve encircling said holder and said wire guide fingers, and wherein said guide fingers terminate at the inner surface of said sleeve.

References Cited in the file of this patent

UNITED STATES PATENTS

| | | |
|---|---|---|
| 1,370,744 | Diehl | Mar. 8, 1921 |
| 1,407,033 | Huggins | Feb. 21, 1922 |
| 1,431,947 | Gysel | Oct. 17, 1922 |
| 1,977,828 | Laib et al. | Oct. 23, 1934 |
| 2,304,520 | Wirtz et al. | Dec. 8, 1942 |
| 2,389,336 | Wirth | Nov. 20, 1945 |
| 2,579,585 | Klinksiek | Dec. 25, 1951 |
| 2,624,518 | Scofield et al. | Jan. 6, 1953 |
| 2,632,602 | Weis | Mar. 24, 1953 |
| 2,647,696 | Brunand | Aug. 4, 1953 |

FOREIGN PATENTS

| | | |
|---|---|---|
| 152,366 | Switzerland | Apr. 16, 1932 |